United States Patent [19]
Willig

[11] Patent Number: 5,866,822
[45] Date of Patent: Feb. 2, 1999

[54] PRESSURE SENSOR PLATE HAVING A PLURALITY OF MEASURING DIAPHRAGMS DISTRIBUTED IN A MATRIX

[75] Inventor: Rainer Willig, Tamm, Germany

[73] Assignee: Robert Bosch GmbH, Stuttgart, Germany

[21] Appl. No.: 981,305

[22] PCT Filed: Apr. 30, 1996

[86] PCT No.: PCT/EP96/01807

§ 371 Date: Dec. 16, 1997

§ 102(e) Date: Dec. 16, 1997

[87] PCT Pub. No.: WO97/00433

PCT Pub. Date: Jan. 3, 1997

[30] Foreign Application Priority Data

Jun. 16, 1995 [DE] Germany ................ 195 21 832.9

[51] Int. Cl.⁶ .................................................. G01L 9/02
[52] U.S. Cl. ............................................................ 73/719
[58] Field of Search .......................... 73/715, 716, 717, 73/719, 720, 721, 722, 723, 725, 726, 727; 338/2, 4

[56] References Cited

U.S. PATENT DOCUMENTS 5,333,504  8/1994  Lutz et al. ................................ 73/727
5,528,214  6/1996  Koga et al. ................................ 338/4

Primary Examiner—William Oen
Attorney, Agent, or Firm—Edwin E. Greigg; Ronald E. Greigg

[57] ABSTRACT

A device for measuring various fluid pressures, the device includes a sensor plate which has fastening holes, which are distributed in matrixlike fashion over the sensor plate. Measuring diaphragms, which form end walls of blind bores in the sensor plate, are located between the fastening holes. Through fluid conduits of a hydraulic block to which the sensor plate can be secured, the measuring diaphragms can be acted upon by pressure. The evaluation is done with four strain gauges applied to each measuring diaphragm, the strain gauges being interconnected to form a Wheatstone bridge. Because it is possible to mount the sensor plate in a way that optimizes strain, it is possible to measure various pressures with minimal measurement error using one sensor plate.

19 Claims, 4 Drawing Sheets

PRESSURE SENSOR PLATE HAVING A PLURALITY OF MEASURING DIAPHRAGMS DISTRIBUTED IN A MATRIX

This application is a 371 of PCT/EP96/01807 filed Apr. 30, 1996.

PRIOR ART

The invention relates to a device for measuring a plurality of fluid pressures. It is intended in particular for mounting on a hydraulic block that is used for hydraulic control of a vehicle brake system.

In hydraulic external-force brake systems, which are equipped with an electrically driven hydraulic pump for generating fuel pressure, it is necessary to measure the brake fluid pressure in wheel brake cylinders and at other points in the brake system such as in a master cylinder or a hydraulic reservoir.

It is known to measure the brake fluid pressure at the various points of the brake system using one pressure sensor each, which is mounted at the respective point or centrally on the hydraulic block and communicates with the various points of the brake system over hydraulic lines. This has the disadvantage of major construction effort and expense.

ADVANTAGES OF THE INVENTION

The pressure measuring device of the invention has a sensor plate with a plurality of measuring diaphragms for measuring various pressures. It is intended especially for hydraulic vehicle brake systems, but can be used equally well for measuring the pressures of any arbitrary fluids. The measuring diaphragms are distributed uniformly in matrix-like fashion on the sensor plate. They can be located for instance at the corners of imaginary equilateral triangles (triangular matrix) or squares (square matrix), or may for instance be distributed equidistantly on one or more imaginary concentric circles.

Fastening devices of the sensor plate, such as screw holes, are arranged uniformly around each measuring diaphragm, and as a result individual fastening devices are simultaneously surrounded by a plurality of measuring diaphragms. Each measuring diaphragm is surrounded by an equal number of fastening devices, which are preferably all spaced equally apart from the respective measuring diaphragm. For instance, if the measuring diaphragms and fastening devices are disposed on triangular matrixes or square matrixes, each measuring diaphragm is located in the middle of an imaginary equilateral triangle or square, whose corners are formed by the fastening devices that surround the measuring diaphragm. In an equidistant arrangement of the measuring diaphragms on a circle, one fastening device is for instance located in the middle of the circle, and a number of fastening devices that equals the number of measuring diaphragms is disposed on a center bisector between each two measuring diaphragms, on a concentric circle surrounding the measuring diaphragms, so that each measuring diaphragm is located between each group of three fastening devices.

The invention has the advantage that a requisite number of measuring diaphragms can be accommodated in a simple way all on the same sensor plate. The mounting and sealing of the sensor plate, for instance on a hydraulic block, are simple and can be accomplished quickly; the pressure sensors required can be manufactured economically. The measuring diaphragms are nearly strain-free, which is a prerequisite for accurate measurements with minimal error over a long period of use. By means of the matching disposition of each measuring diaphragm between the same number of fastening devices, the measuring diaphragms are deformed identically when pressure is imposed, so that for the same pressure, each measuring diaphragm furnishes an identical measurement signal.

Another advantage of the invention is that the measuring diaphragms of the sensor plate, which are disposed close together, and the selected disposition of the measuring diaphragms relative to one another make rapid electrical contacting with a central evaluation circuit possible, which again increases the precision of measurement. In particular, plug connections and long cables between the measuring diaphragms and the evaluation circuit, which from corrosion and aging can lead to elevated transition resistances and can make the outcome of measurement wrong, are unnecessary.

To measure the fluid pressures, preferably elongatable electrical resistors are mounted on the outside or inside of each measuring diaphragm. These resistors deform elastically along with the measuring diaphragm from being acted upon by the fluid whose pressure is to be measured, and this causes them to change their electrical resistance. This change in resistance is utilized for ascertaining the fluid pressure. Strain gauges, for instance, may be applied as elongatable electrical resistors to the measuring diaphragms using thin-film, thick-film or foil technology.

To reduce the measurement error, four elongatable electrical resistors are mounted on each measuring diaphragm, and are interconnected as a so-called full bridge (Wheatstone bridge); as a result, changes in resistance caused by temperature changes, for instance, can be compensated for.

The disposition of the four full bridge resistors can also be used to improve the outcome of measurement. Two resistors are disposed in the middle of each measuring diaphragm, and the two other resistors are disposed diametrically opposite, on the circumference of the measuring diaphragm. These are the zones of greatest oppositely oriented mechanical strains. The elongation directions of the four resistors are parallel to one another and to an imaginary diameter line through the two resistors disposed on the circumference of the measuring diaphragm. One outer resistor each is connected in series with one middle resistor. By this arrangement of the four bridge resistors, maximum pressure sensitivity of the bridge circuit is achieved.

With a generally flat sealing element with one-piece O-rings, blind bores that contain the measuring diaphragms in the sensor plate can be sealed off, from the hydraulic block, for example, with minimal effort and expense. Surfaces of the sensor plate and of the hydraulic block that face one another need not be provided with recesses into which sealing rings can be placed. The generally flat sealing element is used to position the O-rings during assembly. It does not have to be present over the entire surface of the sensor plate; webs that connect the O-rings to one another are sufficient.

BRIEF DESCRIPTION OF THE DRAWING

The pressure measuring device of the invention will be described below in terms of two exemplary embodiments shown in the drawing. Shown are.

The drawings are to various different scales.

DESCRIPTION OF THE EXEMPLARY EMBODIMENTS

Figure 1:
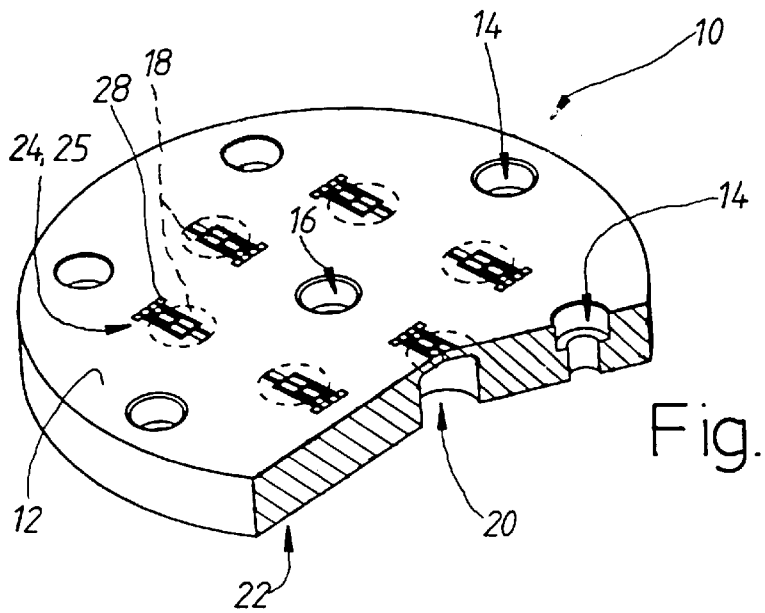
FIG. 1, a round sensor plate according to the invention, shown in section and in perspective.

The pressure measuring device 10 according to the invention, shown in FIG. 1, has a circular sensor plate 12 made of metal. It may also comprise ceramic, for example. It has a total of seven screw holes 14, 16 as fastening devices for mounting the sensor plate 12 to some other component. One of the screw holes 16 is located in the middle of the sensor plate 12, while the other six screw holes 14 are located equidistant from one another, near the edge, at the circumference of the sensor plate 12. The screw holes 14 near the edge have the same spacing from the middle screw hole 16 as from each of the adjacent screw holes 14 near the edge. At the center point of an imaginary triangle, whose corners are formed by two adjacent screw holes 14 near the edge and by the middle screw hole 16, there is a single measuring diaphragm 18. Because of this distribution of the screw holes 14, 16 and measuring diaphragms 18 on the sensor plate 12, the measuring diaphragms 18 remain virtually strain-free when the sensor plate 12 is mounted on a component. Any residual strain that may be present despite this strain-optimizing placement has the same effect in each measuring diaphragm 18, because of the matching arrangement of each measuring diaphragm 18 in the middle between three screw holes 14, 16. Slight errors in measurement from such residual strains are thus the same for all six measuring diaphragms 18, and thus for the same measured values, the same pressure prevails at the measuring diaphragms 18.

Figure 2:
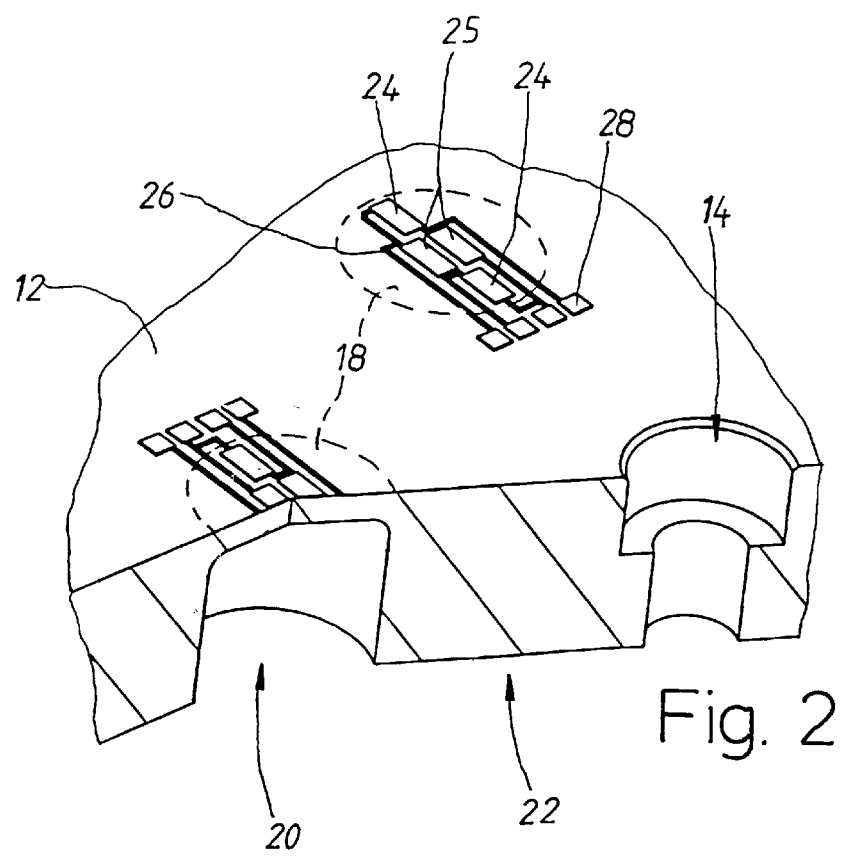
FIG. 2, an enlarged detail of FIG. 1.

The measuring diaphragms 18 are integral with the sensor plate 12 (FIG. 2); they are formed by a blind bore 20 from a fastening side 22 of the sensor plate 12, which side comes to rest on a component to which the sensor plate 12 is fastened. The blind bores 20 may for example be drilled, or if the sensor plate 12 is a sintered part they may be made in the course of the sintering process. An end wall of the blind bores 20 forms the measuring diaphragms 18. The diaphragm diameter is 10 mm. The diaphragm thickness, in the exemplary embodiment, is between 0.5 and 1 mm, depending on the pressure the pressure measuring device of the invention is intended to measure and on the bursting pressure that the measuring diaphragms 18 must withstand. In the exemplary embodiment, the measurement pressure is up to 250 bar, and the rated bursting pressure is 1200 bar.

Four strain gauges 24, 25 are applied to each measuring diaphragm 18 by thin-film, thick-film or foil technology; of them, two strain gauges 24 are located diametrically opposite one another in the peripheral region of the measuring diaphragms 18, and the other two strain gauges 25 are disposed next to one another in the center of the measuring diaphragms. All four strain gauges 24, 25 are parallel to one another and are disposed with their longitudinal and elongation direction parallel to an imaginary diameter line through the two peripherally located strain gauges 24. If the measuring diaphragm 18 is deformed upon the imposition of pressure, the strain gauges 24, 25 elongate or are upset, and they change their electrical resistance, and this is utilized to ascertain the pressure. By means of conductor tracks, the resistors 24, 25 are interconnected to form a full bridge (Wheatstone bridge) and are electrically conductively connected to four terminal contacts 28.

Figure 3:
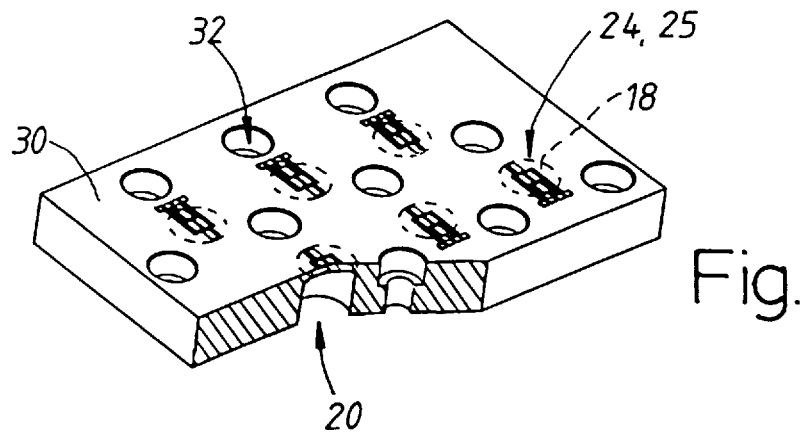
FIG. 3, a rectangular sensor plate, shown in section, in a second embodiment of the invention.

FIG. 3 shows a second embodiment of a sensor plate 30 of a pressure measuring device according to the invention. The sensor plate 30 is rectangular; a total of six measuring diaphragms 18 with resistor bridges 24, 25 mounted on them are disposed in two rows side by side, the rows being offset by half the spacing between two measuring diaphragms 18; that is, the measuring diaphragms 18 of one row face the gaps between measuring diaphragms 18 in the other row. In this way, each measuring diaphragm is spaced apart by the same distance from the adjacent measuring diaphragms 18 and are located at the corners of imaginary equilateral triangles.

Between and around the six measuring diaphragms 18, screw holes 32 are arranged in the manner of a triangular matrix of equilateral triangles. The measuring diaphragms 18 are accordingly, as in the round sensor plate 12, located in the middle of an imaginary equilateral triangle, whose corners are formed by three screw holes 32.

With the exception of the shape of the sensor plate 30 and the disposition of the measuring diaphragms 18 and screw holes 32, this sensor plate matches the sensor plate 12 shown in FIG. 1 and functions in the same way. To avoid repetition, the descriptions of FIGS. 1 and 2 therefore apply to this extent. Below, the pressure measuring device of the invention will be described in terms of the rectangular sensor plate 30, but the description applies correspondingly to the round sensor plate 12 as well.

Figure 4:
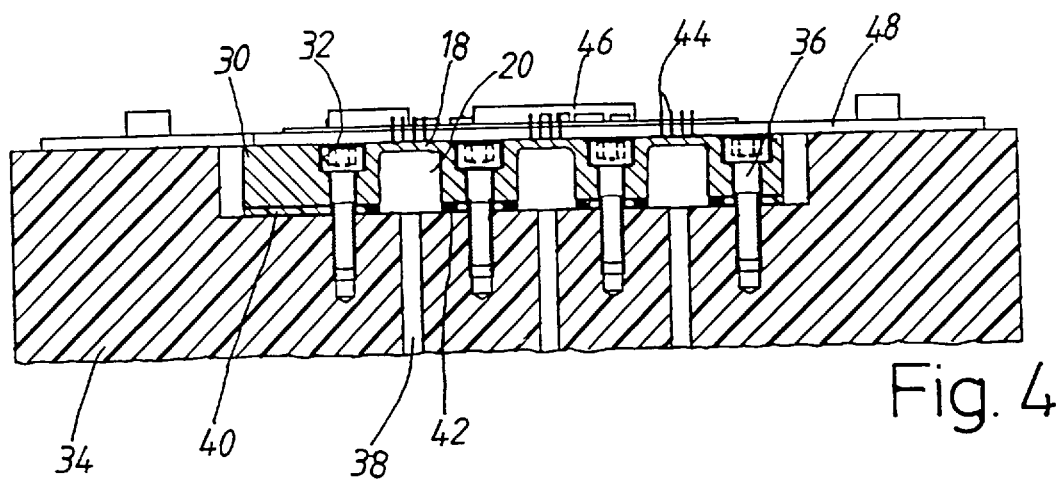
FIG. 4, a sectional view of a pressure measuring device of the invention.
Figure 5:
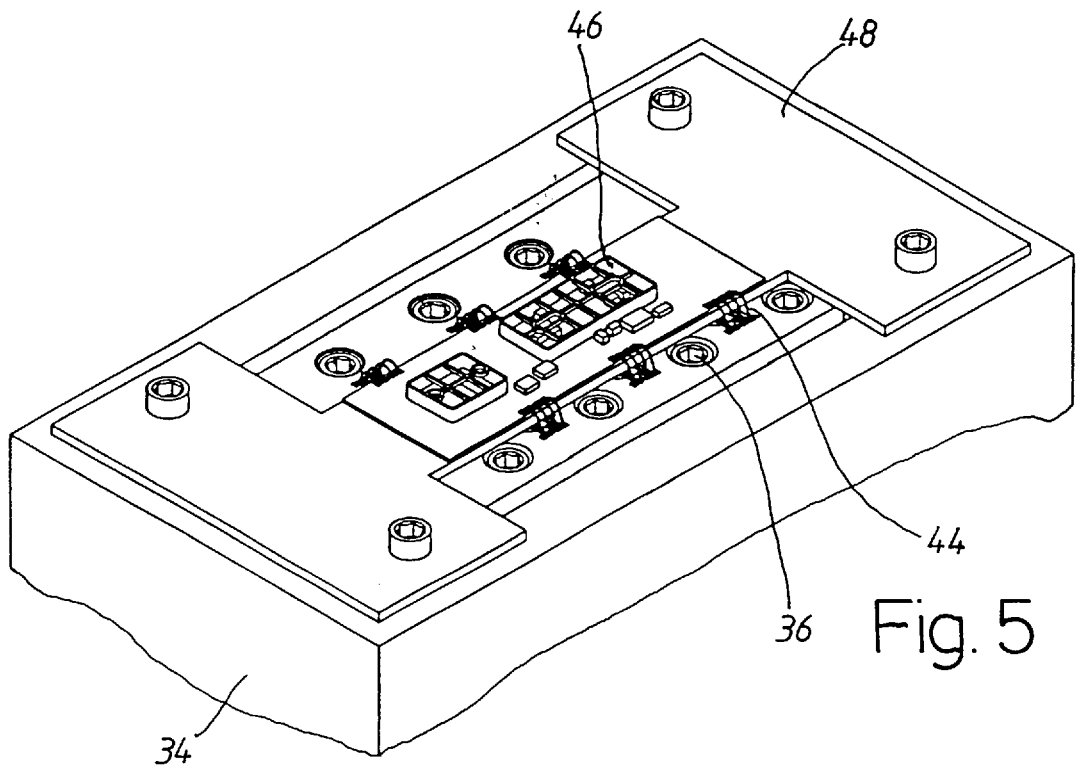
FIG. 5, a perspective view of the pressure measuring device of FIG. 4.
Figure 6:
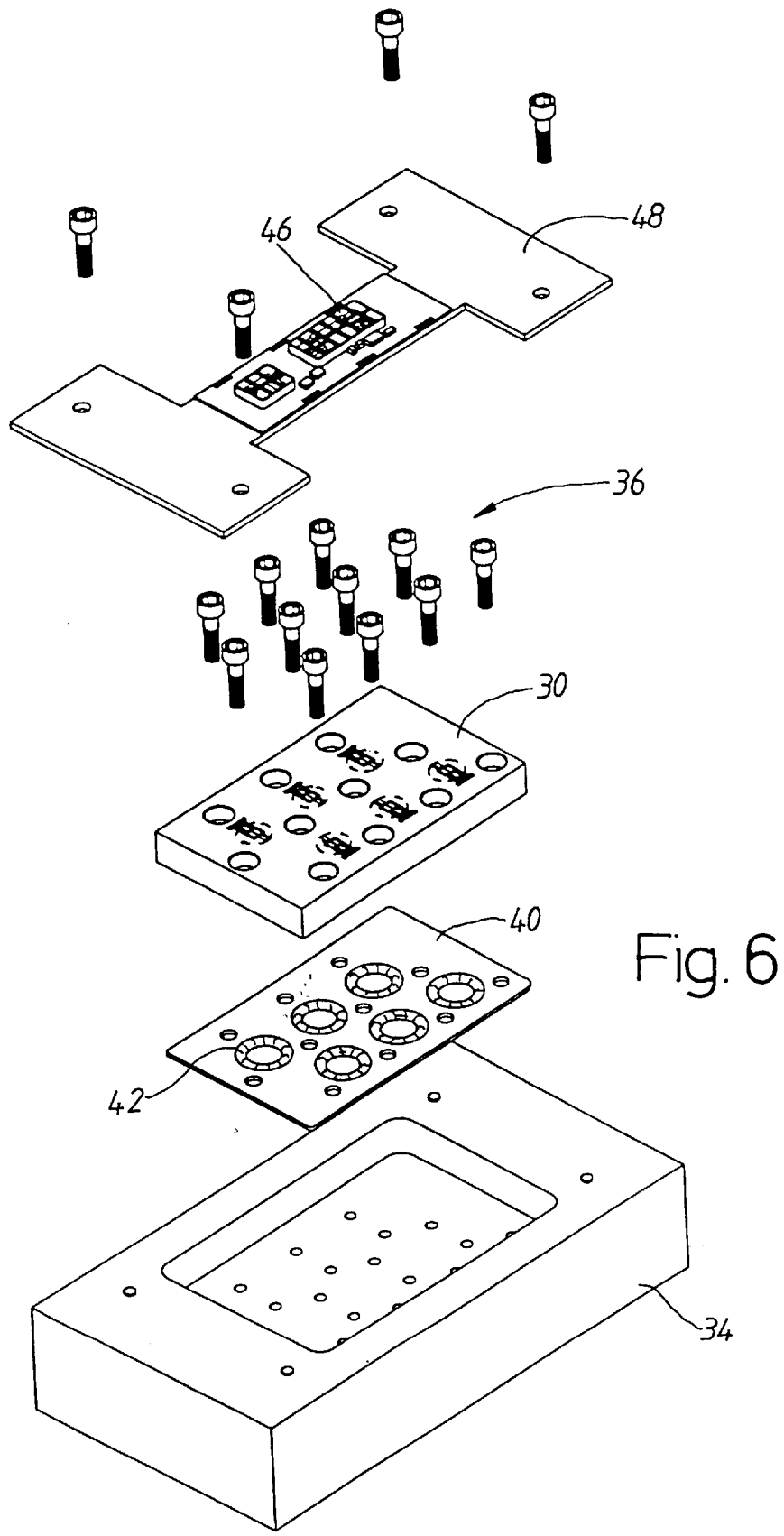
FIG. 6, an exploded view of the pressure measuring device of FIG. 4.

FIGS. 4 and 5 show a pressure measuring device of the invention, in which the rectangular sensor plate 30 is screwed to a hydraulic block 34 by means of screws 36 passed through the screw holes 32 of the sensor plate 30. The section shown in FIG. 4 through the pressure measuring device of the invention extends in alternation through a screw hole 32 and through a blind bore 20 of a measuring diaphragm 18, although in fact these are in two different planes. One fluid conduit 38, through which a measuring diaphragm 18 can be acted upon by fluid, discharges into each of the blind bores 20. For sealing purposes, a sealing plate 40 is inserted between the sensor plate 30 and the hydraulic block 34 (see FIG. 6) and has O-rings 42, integral with it, that it positions at the blind bores 20 of the measuring diaphragms 18. When the sealing plate 40 is not yet installed, a cord diameter of the O-rings 42 is greater than the thickness of the sealing plate 41.

To measure the electrical resistances of the strain gauges 24, 25 and to ascertain the pressure prevailing in the blind bores 20 on the bases of the resistances, the terminal contacts 28 of the strain gauge measurement bridges 24, 25 are connected to an evaluation circuit 46 by thick-wire bonds 44, or in other words aluminum wires that are connected to the terminal contacts 28 by friction welding. The evaluation circuit 46 is mounted on a flat substrate 48, which in plane view has the shape of a double T and is screwed by its stem, extending with slight spacing above the sensor plate 30, to the hydraulic block 34. The terminal contacts 28 are located, freely accessible, close to one edge of the substrate 48 on the sensor plate 30. This is also applicable if the round sensor plate 12, shown in FIG. 1, is used, in which the terminal contacts of three measuring diaphragms 18 are each located on a straight line. The evaluation circuit 46 is located in the center of the six measuring diaphragms 18, resulting in short electrical connection paths, preferably of equal length, from the strain gauges 24, 25 to the evaluation circuit 46. This makes accurate pressure measurements with minimal errors possible.

The evaluation circuit 46 can evaluate the resistances of the strain gauges 24, 25 of all six measuring diaphragms 18. In one embodiment of the invention, the resistances of the strain gauges 24, 25 of the measuring diaphragms are measured and evaluated in succession in a multiplexing mode, so that the resistances of all six measuring diaphragms 18 are thus evaluated by the same electronic components. As a result, different outcomes of measurement when the pressure conditions at different measuring diaphragms 18 are the same are averted.

Figure 7:
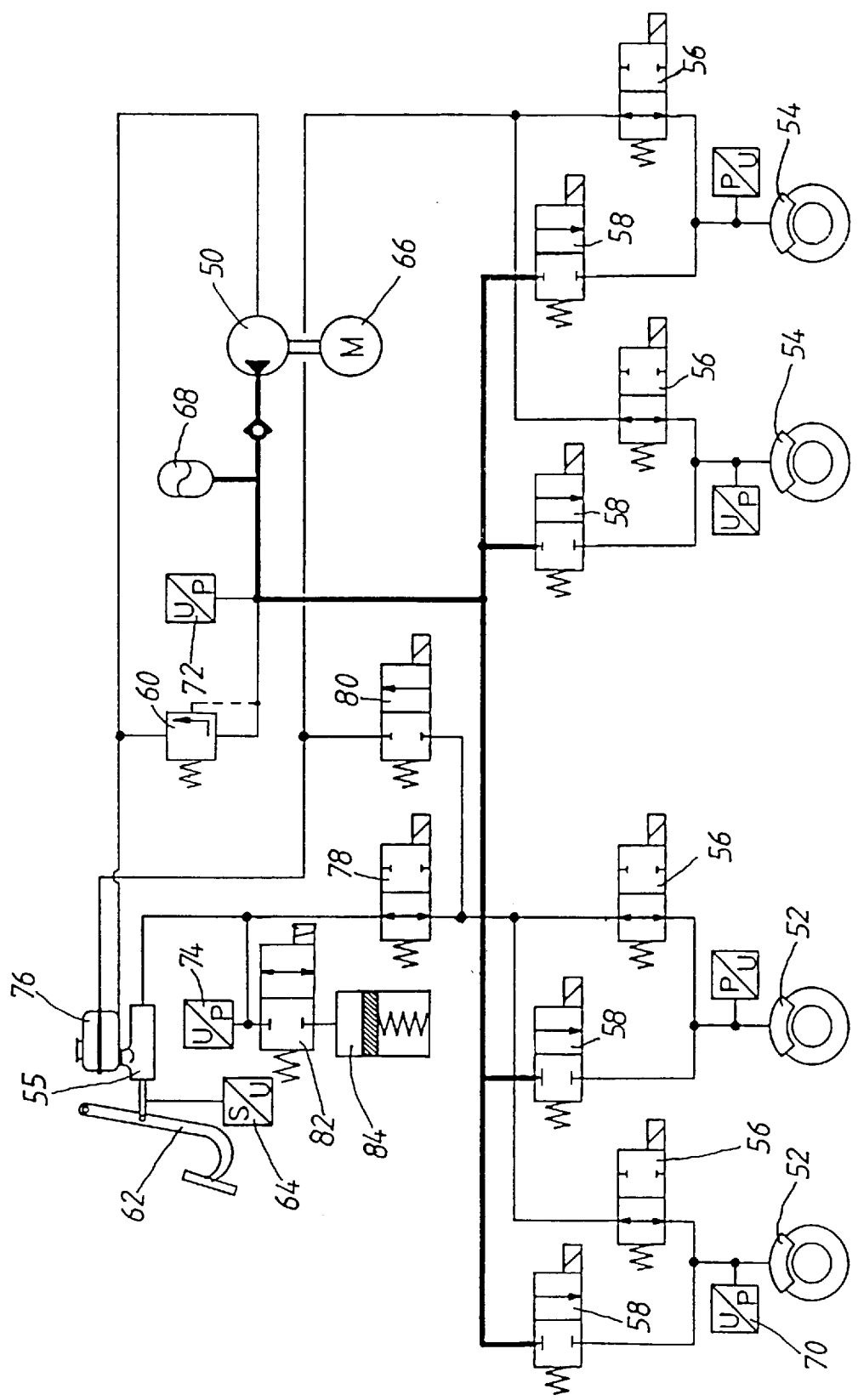
FIG. 7, an electrohydraulic vehicle brake system of the invention.

In FIG. 7, a hydraulic vehicle brake system of the invention using the pressure measuring device described is shown. The vehicle brake system has two brake systems, supplementing one another, namely one service brake system, which generates brake fluid pressure by means of a hydraulic pump 50 and acts on wheel brake cylinders 52, 54 of all the vehicle wheels, and an auxiliary brake system, which draws its brake fluid pressure from a pedal-actuated master cylinder 55, and which acts on the wheel brake cylinders 52 of only two vehicle wheels.

Each wheel brake cylinder 52, 54 has one first shutoff valve 56, which is open in its basic position, and one second shutoff valve 58, which is closed in its basic position.

When a brake pedal 62 of the master cylinder 55 is actuated, a pedal position sensor 64 and a pressure sensor 74 output an electrical signal to a control circuit, not shown, for the brake system that controls both all the valves and an electric pump motor 66 of the vehicle brake system of the invention. The second shutoff valves 58 are opened, and in this way the wheel brake cylinders 52, 54 are acted upon by pressure from a hydraulic reservoir 68, which in turn is put under pressure by the hydraulic pump 50, so that brake fluid under pressure is available even if the hydraulic pump 50 is not in operation. The pressure in the hydraulic reservoir 68 is monitored by a pressure sensor 72. A pressure limiting valve 60 guards the hydraulic reservoir 68 against overloading. Once a brake fluid pressure in the wheel brake cylinders 52, 54 is reached, which is dependent on the pressure generated with the master cylinder 55, the second shutoff valves 58 are closed. The first shutoff valves 56 are closed in this case, so that no brake fluid can escape through them from the wheel brake cylinders 52, 54 during braking with the service brake system.

The brake fluid pressure in the wheel brake cylinders 52, 54, the master cylinder 55, and the hydraulic reservoir 68 is delivered to the measuring diaphragms 18 through lines and through the fluid conduits 38 in the hydraulic block 34. The measuring diaphragms 18, with the strain gauges 24, 25 applied to them and with the evaluation circuit 46, form pressure sensors 70. 72, 74. Their signal is delivered to the control circuit of the vehicle brake system of the invention.

If the brake fluid pressure in the wheel brake cylinders 52, 54 is higher than what corresponds to the pressure generated by the master cylinder 55 and measured with the pressure sensor 74, then brake fluid pressure is reduced by opening the first shutoff valves 56 in the wheel brake cylinders 52, 54, and brake fluid flows into a tank 76 of the master cylinder 55.

If there is a problem in the service brake system and an inadequate brake pressure prevails in the hydraulic reservoir 58, then upon actuation of the brake pedal 62 the first shutoff valves 56 of all four wheel brake cylinders 52, 54 remain open, and the second shutoff valves 58 remain closed. The two wheel brake cylinders 52 that are connected to the auxiliary brake system are acted upon with pressure by the master cylinder 55, through a master cylinder shutoff valve 78 which is open in its basic position and is closed when the service brake system is in use, and which then disconnects the master cylinder 55 from the wheel brake cylinders 52, 54 and from the brake system.

When the service brake system is in use, a return valve 80, which is closed in its basic position, is opened. Through the opened return valve 80, brake fluid can flow out of the two wheel brake cylinders 52 connected to the auxiliary brake system and back into the tank 76 of the master cylinder 55 when the first shutoff valves 56 are opened. When the auxiliary brake system is in use, the closed return valve prevents a return flow of brake fluid from the master cylinder 55 into the tank 76.

Via a shutoff valve 82, which is closed in its basic position, a travel simulator 84, known per se, is connected to the master cylinder 55; in a manner known per se, this travel simulator can hold brake fluid as a function of the pressure, so that when the service brake system is being used and the auxiliary brake system, actuated by the master cylinder 55, the driver will have the familiar feel of the brake pedal, in which the brake pedal 62 yields as a function of the foot power exerted.

The foregoing relates to preferred exemplary embodiments of the invention, it being understood that other variants and embodiments thereof are possible within the spirit and scope of the invention, the latter being defined by the appended claims.

I claim:

1. A device for measuring a plurality of fluid pressures, which comprises a sensor plate (12, 30) with a plurality of measuring diaphragms (18), which can be acted upon from one side by the fluid to be measured, through fluid conduits (38) of a component (34) on which the sensor plate (12, 30) can be mounted, the measuring diaphragms (18) are distributed in matrixlike fashion on the sensor plate (12, 30); the sensor plate (12, 30) has fastening devices (14, 16, 32) for mounting said sensor plate on the component (34), said measuring diaphragms are distributed in matrixlike fashion on the sensor plate (12, 30) in such a way that in each case there is one measuring diaphragm (18) located approximately in a middle between an equal number of fastening devices (14, 16, 32).

2. A device in accordance with claim 1, in which the measuring diaphragms (18) are embodied as end walls of blind bores (20) in the sensor plate (12, 30).

3. A device in accordance with claim 1, in which the measuring diaphragms (18) are integral with the sensor plate (12, 30).

4. A device in accordance with claim 2, in which the measuring diaphragms (18) are integral with the sensor plate (12, 30).

5. A device in accordance with claim 1, in which at least one elongatable electrical resistor (24, 25) is applied to each measuring diaphragm (18), and a length of said resistor and at the same time its electrical resistance changes upon deformation of the measuring diaphragm (18).

6. A device in accordance with claim 2, in which at least one elongatable electrical resistor (24, 25) is applied to each measuring diaphragm (18), and a length of said resistor and at the same time its electrical resistance changes upon deformation of the measuring diaphragm (18).

7. A device in accordance with claim 3, in which at least one elongatable electrical resistor (24, 25) is applied to each measuring diaphragm (18), and a length of said resistor and at the same time its electrical resistance changes upon deformation of the measuring diaphragm (18).

8. A device in accordance with claim 5, in which four elongatable electrical resistors (24, 25) are applied to each measuring diaphragm (18) and are interconnected to form a full bridge circuit.

9. A device in accordance with claim 8, in which two resistors (24) are disposed in a middle of one measuring diaphragm (18), and two other resistors (24) are disposed diametrically opposite one another on a circumference of the measuring diaphragm (18), wherein the elongation directions of the four resistors (24, 25) extend parallel to a diameter line through the two outer resistors (24), and wherein one outer resistor (24) each is connected in series with one middle resistor (25).

10. A device in accordance with claim 5, in which said device has one common electronic evaluation circuit (46) for the resistors (24, 25) of all the measuring diaphragms (18) of the sensor plate (12, 30).

11. A device in accordance with claim 8, in which said device has one common electronic evaluation circuit (46) for the resistors (24, 25) of all the measuring diaphragms (18) of the sensor plate (12, 30).

12. A device in accordance with claim 9, in which said device has one common electronic evaluation circuit (46) for the resistors (24, 25) of all the measuring diaphragms (18) of the sensor plate (12, 30).

13. A device in accordance with claim 10, in which the measuring diaphragms (18) in the sensor plate (12, 30) are covered by a flat substrate (48) for the electronic evaluation circuit (46); that terminal contacts (28) of the electrical resistors (24, 25) applied to the measuring diaphragms (18) are located on the sensor plate (12, 30) freely next to an edge of the substrate (48) and communicate with the electronic evaluation circuit (46) via electrical connection means (44).

14. A device in accordance with claim 10, in which the evaluation circuit (46) operates in a multiplexing mode.

15. A device in accordance with claim 13, in which the evaluation circuit (46) operates in a multiplexing mode.

16. A device in accordance with claim 2, in which between the sensor plate (12, 30) and the component (34) that has the fluid conduits (38), a generally flat sealing element (40) is inserted, said sealing elements includes O-rings (42), integral with it, that encompass orifices of the blind bores (20) in the sensor plate (12, 30), and which has fluid passage openings inside the O-rings (42).

17. A device in accordance with claim 3, in which between the sensor plate (12, 30) and the component (34) that has the fluid conduits (38), a generally flat sealing element (40) is inserted, said sealing elements includes O-rings (42), integral with it, that encompass orifices of the blind bores (20) in the sensor plate (12, 30), and which has fluid passage openings inside the O-rings (42).

18. A device in accordance with claim 5, in which between the sensor plate (12, 30) and the component (34) that has the fluid conduits (38), a generally flat sealing element (40) is inserted, said sealing elements includes O-rings (42), integral with it, that encompass orifices of the blind bores (20) in the sensor plate (12, 30), and which has fluid passage openings inside the O-rings (42).

19. A device in accordance with claim 8, in which between the sensor plate (12, 30) and the component (34) that has the fluid conduits (38), a generally flat sealing element (40) is inserted, said sealing elements includes O-rings (42), integral with it, that encompass orifices of the blind bores (20) in the sensor plate (12, 30), and which has fluid passage openings inside the O-rings (42).

* * * * *